Mar. 6, 1923.
F. E. DEULIN.
LEER CONVEYER FOR CONTINUOUS SHEET GLASS.
FILED DEC. 9, 1921.
1,447,648.
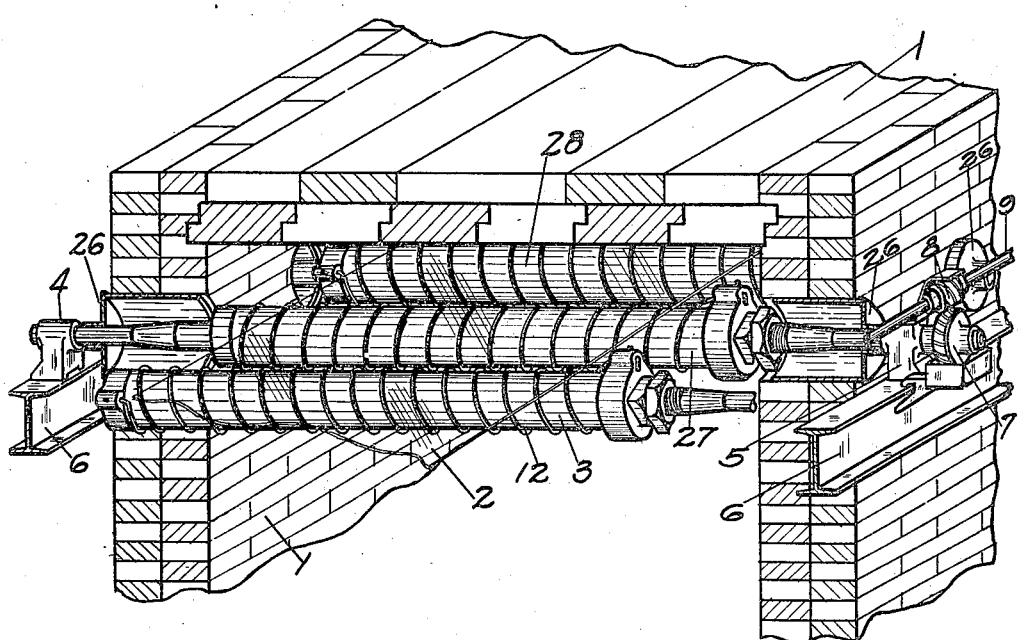
FIG. 1
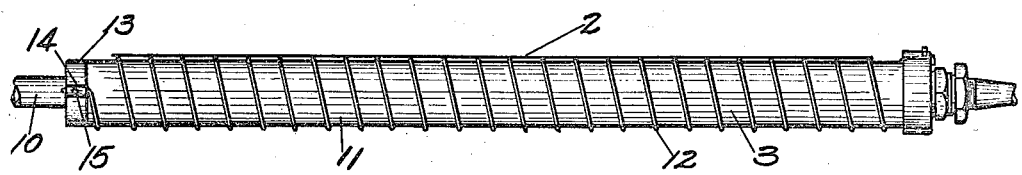
FIG. 2
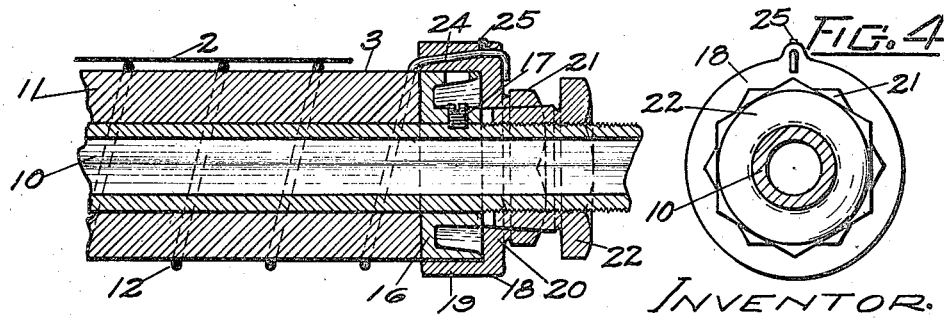
FIG. 3
FIG. 4
INVENTOR.
Fernand E. Deulin.
BY C. A. Rowley
ATTORNEY.

Patented Mar. 6, 1923.

1,447,648

UNITED STATES PATENT OFFICE.

FERNAND E. DEULIN, OF CHARLESTON, WEST VIRGINIA, ASSIGNOR TO THE LIBBEY-OWENS SHEET GLASS COMPANY, OF TOLEDO, OHIO, A CORPORATION OF OHIO.

LEER CONVEYER FOR CONTINUOUS-SHEET GLASS.

Application filed December 9, 1921. Serial No. 521,153.

*To all whom it may concern:*

Be it known that I, FERNAND E. DEULIN, a citizen of the United States, residing at Charleston, in the county of Kanawha and State of West Virginia, have invented new and useful Improvements in Leer Conveyers for Continuous-Sheet Glass, of which the following is a specification.

This invention relates to the art of making sheet glass, and especially to an improved form of leer-conveyer for transporting a continuous sheet of glass through a leer with a minimum amount of injury to the glass sheet.

In certain systems of sheet glass drawing, for example, the Colburn process as shown in the patent to I. W. Colburn, 1,248,809, granted Dec. 4, 1917, a continuous sheet of glass is drawn from a molten source, and after being flattened, is passed horizontally through a rather long horizontal leer, or annealing chamber, in which the temperature gradually decreases from the end where the sheet enters to the end where the sheet passes out to the cutting tables. Different forms of conveyers may be used to advance this sheet through the leer, the usual type comprising a series of spaced driven rollers which carry the sheet. The fine fire polished surface of the sheet is easily scratched, by sliding movement against foreign surfaces, such as that of the rollers. Usually, these rollers are all driven at the same speed from a common source. Now, unless the peripheral speed of these rollers is exactly equal to the speed at which the sheet is fed to the leer by the sheet-drawing mechanism, there will be some relative movement between the sheet and the surfaces of the rollers. Also, due to the contraction of the sheet as it cools, the speed of travel of the sheet is not constant throughout the length of the leer, and if the rollers are all driven at the same speed, some of them must have more or less sliding contact with the sheet. Many, more or less successful, schemes have been devised to properly regulate the speeds of the rollers, but it is practically impossible to eliminate all sliding movement between the sheet and the rollers. It is therefore desirable to provide conveying rollers whose sheet-carrying surfaces will have the least possible tendency to scratch the surfaces of the glass sheet.

The object of the present invention is to provide such a conveyer roller, having an efficient, non-scratching and easily and quickly renewable sheet contacting surface. Specifically, and in the preferable form of the invention, the roller is provided with a soft metal wire, wound spirally around, and secured to, the cylindrical sheet-carrying surface. This wire is of a non-scratching material, and its small total mass makes its temperature quickly adjustable to accord with that of the sheet, and of the portion of the leer in which it is located. Also, by properly spacing the coils of wire, the minimum of contacting surface sufficient to properly support the sheet may be easily provided. Other details and advantages of the invention will be apparent from the following detailed description.

In the accompanying drawings:

Fig. 1 is a perspective view, showing a section through a sheet annealing leer, in which this improved conveyer is installed.

Fig. 2 is an elevation of one of the conveying rollers.

Fig. 3 is a longitudinal section, on a larger scale, through one end of one of the rollers, showing the adjustable anchoring means for the wire.

Fig. 4 is an end view, looking from the right of Fig. 3.

At 1 is indicated a portion of a leer, which is simply a long bricked-in oven, through which the continuous glass sheet 2 is transported over a series of parallel horizontal conveying rollers 3. Each roller is carried revolubly at its ends in bearings 4 and 5, mounted on suitable supports 6. Usually the rollers are all driven from a common source of power, for example, a worm-wheel 7 secured to the roller-shaft end meshes with a worm 8 on a drive-shaft 9. If desired, part, or all, of the rollers could be run as idlers.

Each roller 3 comprises a central supporting shaft, preferably a piece of tubular metal piping 10, on which is carried a cylindrical sleeve member 11 of clay, or other refractory material, or metal. Any material may be used that will stand up under the rather high temperatures prevalent in the hotter end of the leer. Around this supporting cylindrical sleeve 11 is wound a continuous length of rather heavy metallic wire 12. This wire forms a continuous spiral rib or thread on the surface of the cylinder. The wire is round in cross-section and will be preferably about one-quarter of an inch in diameter, although other sizes may be used, provided the wire is not too large to be compactly wound around the cylinder. The convolutions of this wire are spaced apart so as to provide the minimum amount of contacting surface to properly support the sheet. The convolutions should be closer together at the hot end of the leer where the glass sheet is more plastic and flexible, but in the cooler portions of the leer where the sheet is completely set, the convolutions may be spaced quite far apart. It is not necessary that the spacing be adjusted, as just described, nor is it essential that the convolutions be evenly spaced on the same roller.

This wire is preferably formed of some soft metal such as aluminum, which will not scratch glass. Other non-scratching metals, such as nickel, or suitable alloys may be used. It is only essential that the metal be too soft to scratch the glass sheet, and still have sufficient tensile strength and a sufficiently low melting point to stand up under the normal operating conditions.

At one end of the roller is a metal collar 13, having an ear 14, in which one end of the wire is anchored, as by means of a set-screw 15. An adjustable anchoring means for the wire is preferably provided at the other end of the roller. As here shown, a metal collar 16 is secured to shaft 10, at the end of sleeve 11, as by means of screw-plug 17. Mounted on the collar 16 is adjusting ring 18, comprising a cylindrical flange 19 surrounding the collar, a radial flange 20, bearing against the outer end of the collar, and an extension 21 of flange 20, having an inner tapered opening coaxial with the shaft 10. The extension 21 has an outer hexagonal surface to be engaged by a suitable wrench to adjust the ring 18 circumferentially. Threaded on shaft 10 is a nut 22 having an outer tapered surface which is adapted to be wedged into the opening in ring 18 to lock the ring in place. The end of the wire 12 is threaded through the hole 24 in ring 18, and secured in place by set-screw 25. The form of adjustable anchoring means just described is merely an example of one form that may be used.

The wires, being of a relatively soft material may in time become worn or broken. In such case they may easily and economically be replaced. The worn wire is removed, a new length of wire fastened in the stationary anchor 14, and the wire wound as tightly as possible around the cylinder. The other end is then fastened in the adjusting ring 18, and the wire drawn tight by turning the ring around the shaft in the direction in which the wire is wound. The lock nut 22 is then screwed into place. If the wire 13 becomes too loose through expansion while in the heated leer, it may be tightened from outside the leer, by the use of suitably shaped wrenches inserted through the openings in the leer walls through which the roller shafts project. These openings are normally covered by removable plates 26.

Since the screw action of the spirally wound wires or threads might have a tendency to carry the sheet toward one side of the leer, the wires are wound reversely on the alternate rollers throughout the length of the leer. For example, as shown in Fig. 1 of the drawings, the first roller 3 is wound in the direction of a right-handed thread or screw, as viewed from the right of the figure. The second roller 27 is wound in the direction of a left-handed thread, as seen from the same side of the leer. The third roller 28 is wound right-handedly like the first, and so on alternately through the leer. In this way the tendency of half of the rollers to carry the sheet toward the left is counteracted by the tendency of the remaining rollers to carry the sheet toward the right.

As the sheet 2 is carried through the leer, it is supported on a series of rounded soft metallic surfaces which contact as small a portion of the surface of the sheet as will properly support the same. As these contacting points are constantly shifting transversely of the sheet, there is no tendency for the sheet to become grooved, as might result from supporting the sheet continuously along fixed longitudinal lines. Since only a small amount of metal is embodied in the winding on a roller it will quickly accommodate itself to the temperature of the leer and glass sheet, and thus avoid the danger of shredding the sheet through contact with a metal of different temperature. Since the sheet contacting face of the roller may be easily and quickly renewed by simply putting on a new wire, the life of the roller may be prolonged indefinitely at a very small cost. It is quite unnecessary to provide a smooth even surface on the cylinder 11, as is the case when the sheet is carried directly by this surface. This surface need only be fairly round and true; a little roughness of the surface will assist in holding the wire coils in position.

Claims:

1. A roller for a sheet glass conveyer, comprising a cylindrical roller member, and a metallic wire wrapped spirally around the cylindrical surface of the roller.

2. A roller for a sheet glass conveyer, comprising a cylindrical roller member, and an aluminum wire wrapped spirally around the cylindrical surface of the roller.

3. A roller for a sheet glass conveyer, comprising a cylindrical roller member, a metallic wire wrapped spirally around the cylindrical surface of the roller, and means for adjustably holding the wire in place.

4. A roller for a sheet glass conveyer, comprising a cylindrical roller member, having a removable spiral metallic rib on its cylindrical sheet-carrying surface.

5. A roller for a sheet glass conveyer, comprising a cylindrical roller member, and a removable metallic covering for the cylindrical sheet-carrying surface of the roller.

6. A roller for a sheet glass conveyer, comprising a cylindrical roller member, and a removable aluminum covering for the cylindrical sheet-carrying surface of the roller.

7. In a conveyer for carrying sheet glass through a leer, a series of similar parallel rollers, each roller comprising a cylindrical body member, and a metallic wire wound spirally around its cylindrical sheet-carrying surface, the wires being wound alternately in opposite directions on the successive rollers throughout the series.

8. In a conveyer for carrying sheet glass through a leer, a series of similar parallel rollers, each roller comprising a cylindrical body member, and an aluminum wire wound spirally around its cylindrical sheet-carrying surface, the wires being wound alternately in opposite directions on the successive rollers throughout the series.

9. In a conveyer for carrying sheet glass through a leer, a series of similar parallel rollers, each roller comprising a cylindrical body member, a metallic wire wound spirally around its cylindrical sheet-carrying surface, the wires being wound alternately in opposite directions on the successive rollers throughout the series, and adjustable anchoring means for the ends of the wire.

Signed at Charleston, in the county of Kanawha, and State of West Virginia, this 5th day of December, 1921.

FERNAND E. DEULIN.